United States Patent [19]
von Borstel

[11] Patent Number: 5,590,146
[45] Date of Patent: Dec. 31, 1996

[54] GAS LASER

[75] Inventor: Michael von Borstel, Stuttgart, Germany

[73] Assignee: Trumpf Lasertechnik GmbH, Ditzingen, Germany

[21] Appl. No.: 444,782

[22] Filed: May 19, 1995

[30] Foreign Application Priority Data

May 19, 1994 [DE] Germany .......................... 44 17 468.3

[51] Int. Cl.⁶ ................................ H01S 3/22; H01S 3/223
[52] U.S. Cl. ................................................. 372/58; 372/59
[58] Field of Search ............................... 372/35, 58, 59

[56] References Cited

U.S. PATENT DOCUMENTS

| | | | |
|---|---|---|---|
| 3,970,957 | 7/1976 | Regan | 372/58 |
| 4,550,409 | 10/1985 | Kaye | 372/58 |
| 4,849,984 | 7/1989 | Hill | 372/58 |
| 5,014,281 | 5/1991 | Hecht et al. | 372/58 |
| 5,020,069 | 5/1991 | McNeil et al. | 372/59 |
| 5,111,473 | 5/1992 | Rebhan et al. | 372/59 |
| 5,206,873 | 4/1993 | Funakubo et al. | 372/58 |
| 5,239,553 | 8/1993 | Ono et al. | 372/58 |
| 5,319,663 | 6/1994 | Reid et al. | 372/58 |
| 5,426,659 | 6/1995 | Sugiyama et al. | 372/58 |

*Primary Examiner*—Rodney B. Bovernick
*Assistant Examiner*—Robert E. Wise
*Attorney, Agent, or Firm*—Pepe & Hazard

[57] ABSTRACT

In a gas laser (1) with a laser gas circulation path (5) in which a fan (4) conveys the laser gas (6) through a laser discharge space or tube (2) and a cooling system (3a, 3b), the gas throughput is increased by a bypass (8) of the laser discharge space (2). In the bypass may be a filter, cooler and catalyst for treating that portion of the laser gas flowing therethrough. The volume of gas diverted through the bypass may be adjusted to improve the efficiency of the laser.

25 Claims, 1 Drawing Sheet

GAS LASER

BACKGROUND OF THE INVENTION

The present invention is directed to a gas laser with a laser gas circulating system in which there is a fan which moves a laser gas through the gas laser discharge tube or space and through a cooling system.

Such gas lasers are known in many forms and embodiments. The laser gas is circulated by the fan in such gas lasers and moved to and through the laser discharge space. In addition, the laser gas is fed through a cooling system in which the heat generated in the discharge space and by the fan is extracted from the gas. Particularly in a high performance gas laser, there are correlations between the characteristic variables of the laser, such as, for example, the beam diameter, the beam quality, the laser length, and the laser discharge space which will include its geometry, i.e., the diameter and length of the discharge tube, the gas pressure, the gas temperature, the efficiency of the laser, the flow resistance, the gas throughput, etc.

In order to be able to achieve optimum results, the fan should be coordinated with these variable characteristics of the laser. However, if the laser and the fan are coordinated with one another by setting the variable characteristics of the laser or the characteristic variables of the fan, this may apply to only one of the laser's operating states. However, some characteristic variables cannot be set, including the diameter of the discharge tube for example. A change can take place here only by changing the tube.

In designing the laser, one must try to reach the operating point on the fan curve where there is the greatest possible gas throughput. The fan curve is understood as the connection between the pressure quotient $\Pi = P_{pressure}/P_{suction}$ and the volume current Vo of the fan. Based on the characteristic data (geometry of discharge space), it is possible that the operating point does not lie in the optimal range. Also there is always the risk in lasers with very high flow resistance, that the fan no longer blows or goes into an operating state in which the fan's blowing capacity fluctuates.

It is an object of the invention to provide a novel gas laser in which the volume flow of gas through the laser is increased without changing its basic components.

Another object of the invention is to provide such a laser in which there is an additional flow path for a volume of the gas.

SUMMARY OF THE INVENTION

It has now been found that the foregoing and related objects may be readily attained by providing a laser assembly in which there is a bypass through which part of the laser gas is moved by the fan to bypass the laser discharge chamber or space.

The bypass allows the fan to move a greater gas volume than can be pumped through the laser discharge space at a given pressure ratio. The additional volume of gas moved by the fan, which does not flow through the laser discharge space, can be subjected to particular treatments such as, for example, cooling.

If the operating point is on the left ascending branch of the fan curve, then, as the volume current increases, there is an increase in the pressure differential produced by the fan and hence an increase in the pressure quotient. However, a higher pressure quotient also causes a higher gas flow through the laser discharge space. As a result of this higher gas throughput, there is less heating of the gas in the laser discharge space. In addition, because there is less heating, the performance of the gas laser can be increased. For example, the power of a 1500 watt laser can be raised to 1700 watts. The prerequisite for this effect is that the former operating point be on the left, ascending branch of the $\pi$-Vo curve of the fan. Diverting some of the laser gas through the bypass pushes the operating point into an area on the curve in which a higher volume of gas is moved.

The present invention creates a simple way of harmonizing the characteristic data of the laser and of the fan with one another, thereby achieving an increase in power, as already explained above. In addition, commercial fans can be used on lasers with high pressure resistance. This has the advantage that expensive, flow-optimized components can be used on lasers with high pressure resistance.

One simple structural embodiment connects the bypass between the pressure side of the fan and its suction side. Part of the volume of gas is thus branched off directly at the fan output and taken to the fan input. One advantageous embodiment therefore provides for the bypass to be in the fan housing or a part of the fan housing.

A preferred embodiment uses a turbo-radial fan. It has been shown that such fans, on one hand, have the desired curve and, on the other hand, are available as commercial fans.

A simple change in throughput can be achieved by making the bypass able to be switched on and off. This can be done simply by having a flow valve included at the bypass input or output. This flow valve can be operated manually or mechanically.

In order to improve the quality of the laser gas or to extend the effective life of the laser gas, part of the stream of laser gas can be cleaned. For this, it is advantageous to have a filter unit for cleaning at least part of the stream of laser gas flowing in the bypass. For example, there may be a particle absorber in this filter unit through which the partial stream of laser gas is fed, and the impurities in the stream of laser gas are filtered out in the form of particles and in this way removed from the stream of gas.

The pressure quotients that can be achieved by the fan can be controlled simply by having an adjustable flow resistor in the bypass. By changing the flow resistor, the volume of the partial stream of laser gas going through the bypass can be changed, and the total volume through the fan, and, accordingly, the pressure quotient, can be changed. The operating point of the fan can be set to the desired value by adjusting the flow resistor appropriately.

In one especially preferred embodiment, there is a measuring device for the respective volume of flow and/or pressure of the laser gas in the circulating system for the laser discharge space. With this measuring device, the operating point of the fan can be changed, and this is made possible by connecting the measuring device by a control device to the adjustable flow resistor in the bypass. A change in the volume of flow and thus the pressure differential can also take place while the gas laser is operating, and it can be adjusted immediately in response to changing operating conditions. The control device can be programmed so that given values for the flow resistor can be assigned to the volume of flow measured.

There is another advantage to having a cooling device in the bypass. With this cooling device, this partial stream of the laser gas can also be cooled, whereby the total temperature of the laser gas can be reduced.

With one preferred embodiment, the gas laser is a $CO_2$ laser, i.e., $CO_2$ is used as the laser gas. Gas lasers have the disadvantage that, in the laser discharge space, the laser gas undergoes a chemical reaction. For example, $CO_2$ is reduced to CO. According to one embodiment of the invention, there is a catalyst, especially an oxidation catalyst, in the bypass. With this catalyst, this partial volume of flow can now be treated, and the CO contained therein can be oxidized to $CO_2$ which is then recirculated through the gear laser space. The high flow resistance of the catalyst, which prevents the catalyst from being incorporated into the main stream, plays no role in the bypass, since it can be adjusted any way desired.

Preferably, the bypass comprises several individual ducts. This has the advantage of being able to switch ducts on and off separately. With these ducts, the cross section of the bypass can be changed and the volume of the partial stream of laser gas which flows through the bypass can thus be changed in a particular way.

The present invention is not limited to gas lasers with gas circulation, but can also be used in gas lasers with several separate or coupled gas circulation systems with a corresponding number of fans.

BRIEF DESCRIPTION OF THE DRAWINGS

Other advantages, features and details of the invention will be apparent from the following description, in which one preferred embodiment is shown schematically. With reference to the drawings.

DETAILED DESCRIPTION OF THE PREFERRED EMBODIMENT

Figure 1:
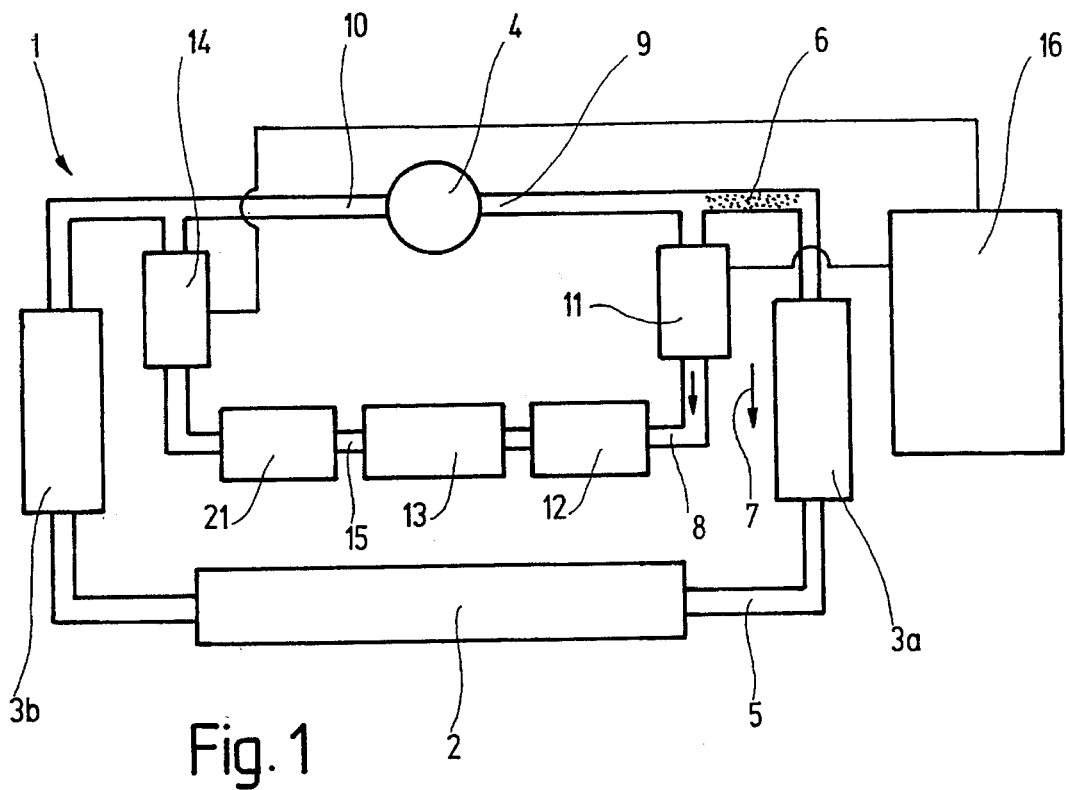
FIG. 1 schematically illustrates a gas laser with the bypass of the present invention.

FIG. 1 schematically illustrates the components of a complete gas laser assembly generally designated by the numeral 1. Its major components are the laser gas discharge space or tube 2, the cooling system 3a, 3b, and the fan 4, which is preferably a turbo-radial fan. These components are connected to one another by a laser gas circulating system 5 in which the laser gas 6 flows. The fan 4 moves the laser gas 6 in the direction of the arrow 7 through the laser gas discharge tubes or space 2 and through the cooling system 3a, 3b.

A bypass 8 is also connected into the laser gas circulating system 5. The pressure side 9 of the fan 4 is connected to the suction side 10 by this bypass 8. In this manner, some of the laser gas 6 can go through the bypass 8 rather than through the laser discharge space or tube 2 to the suction side 10 of the fan 4. Thus, it is possible for the fan 4 to move a higher volume of gas therethrough. In the bypass 8, there are, in sequence, an adjustable flow resistor 11, a filter unit 12 such as a particle absorber, a cooling device 13, a measuring device 14 and a catalyst chamber 21. By use of the cooling device 13 and the measuring device 14, the bypassed gas flow 15 controlled by the flow resistor 11 is cooled and measured.

Some of the laser gas moved by the fan 4 is chemically treated in the catalyst chamber 21. In $CO_2$ lasers, CO is oxidized into $CO_2$ by the catalyst so that it is available again for recycling and use in the laser discharge space or tube 2.

FIG. 1 also shows a control device 16 which is connected to the flow resistor 11 and the measuring device 15. By the control device 16, the volume of the stream of laser gas 15 going through the bypass 8 can be set at a desired value so that the fan 4 may work at an optimal operating point.

Figure 2:
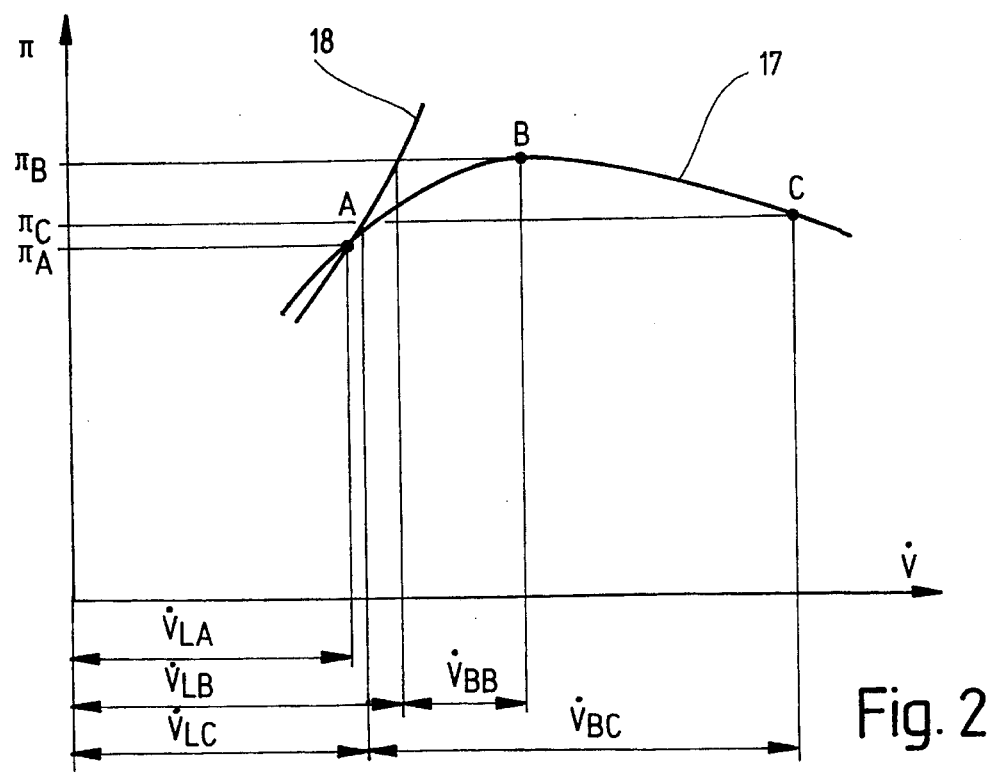
FIG. 2 is a π-Vo diagram in which the curve of the fan and the curve of the laser are illustrated.

FIG. 2 shows a π-Vo diagram in which part of the curve 17 of the fan 4 and part of the curve 18 of the laser are shown. When the bypass 8 is closed, the gas laser 1 works at operating point A. At this operating point A, the fan 4 produces a pressure quotient $\pi_A$ and a volume flow $Vo_{LA}$.

If one part of the bypass 8 is switched on, then the volume is increased through the fan 4 to a value of $V_{LA}+V_{LB}$. At this volume of gas, a pressure quotient of $\pi_B$ prevails so that the fan 4 now works at the maximum operating point B.

It can be seen from the diagram that, at a pressure quotient $\pi_B$, the laser has a volume current $V_{LB}$ flowing through it. The bypass partial current 15 thus yields $V_{LB}$.

If not just one part of the bypass 8, but the whole bypass 8 is turned on, then the volume of gas through the fan 4 is increased to a value $V_{LC}+V_{BC}$. This volume of gas is moved at operating point C. There, a pressure quotient $\pi_c$ prevails, which is somewhat less than pressure quotient $\pi_B$ since the maximum operating point B is exceeded. The gas laser works at the operating point C in a range with higher moving capacity. It can also be seen from FIG. 2 that the volume stream $V_{LC}$ of the gas discharge space is slightly smaller than at operating point B, but the bypass 8 has a substantially greater gas throughput than at the maximum operating point B. This gas volume can be treated such as cooling by the cooling device 13.

The diagram of FIG. 2 shows simply that increasing the volume current produces an increase in the pressure quotient π and an increase in the volume through the laser or through the gas discharge space 2. An attempt may be made to make the fan 4 work at the optimum operating point C by having a larger gas throughput in the gas discharge space 2 than at operating point A, and by having the bypass 8 carrying a large gas volume. This way, the power of the gas laser 1 can be increased by simple measures.

Even if the curve 17 shows no marked maximum, but rather a "high plateau" near the maximum, this is an advantage in the invention since then a larger volume of gas $V_{LC}$ is possible than at operating point A. If the volume current $V_{LC}$ is somewhat smaller than the volume current $V_{LB}$ at the maximum operating point B, at the optimal operating point C the volume $V_{LC}$ is increased substantially by the bypass 8.

Having thus described the invention, what is claimed is:

1. A gas laser assembly having
   (a) a laser-gas circulation path (5) including a fan (4) which moves the laser gas (6) through the laser discharge space (2) and a cooling system (3a, 3b);
   (b) a bypass (8) connected to said path on opposite sides of said fan through which a part (15) of the laser gas (6) is moved by the fan (4) to bypass the laser discharge space (2); and
   (c) means for opening and for blocking said bypass (8) so that it can be turned off and on.

2. A gas laser assembly according to claim 1 wherein the pressure quotient of the fan (4) rises as the volume current (V) increases at least in increments or is constant.

3. A gas laser assembly according to claim 1 wherein said fan (4) is a turbo-radial fan.

4. A gas laser assembly according to claim 1 wherein said bypass (8) connects the pressure side (9) of the fan (4) to its suction side (10).

5. A gas laser assembly according to claim 4 characterized by the fact that the bypass (8) is in the fan (4) housing of said fan (4).

6. A gas laser assembly according to claim 1 wherein there is included in said bypass a filter unit (12) for cleaning the laser gas flowing therethrough.

7. A gas laser assembly according to claim 1 wherein there is included in one of said bypass and circulation path (5) a measuring device (14) for the volume of said laser gas flowing therethrough.

8. A gas laser assembly according to claim 7 wherein said measuring device (14) is connected to an adjustable flow resistor (11) in said bypass (8) by a control device (16).

9. A gas laser assembly according to claim 1 wherein there is included in said bypass a cooling device (13).

10. A gas laser assembly according to claim 1 wherein said gas laser assembly is a $CO_2$ laser.

11. A gas laser assembly according to claim 1 wherein there is included in said bypass a catalyst (21) for treating the gas flowing therethrough.

12. A gas laser assembly according to claim 1 wherein said bypass (8) is comprised of several individual ducts.

13. A gas laser assembly according to claim 12 wherein said individual ducts can be separately opened and closed.

14. A gas laser assembly comprising:

(a) a laser-gas circulation path (5) including a fan (4) which moves the laser gas (6) through the laser discharge space (2) and a cooling system (3a, 3b);

(b) a bypass (8) connected to said path on opposite sides of said fan through which a part (15) of the laser gas (6) is moved by the fan (4) to bypass the laser discharge space (2); and (c) an adjustable flow resistor (11) in said bypass.

15. A gas laser assembly according to claim 14 wherein the pressure quotient of the fan (4) rises as the volume current (V) increases at least in increments or is constant, wherein said fan (4) is a turbo-radial fan, and wherein said bypass (8) connects the pressure side (9) of the fan (4) to its suction side (10).

16. A gas laser assembly according to claim 14 wherein there is included in said bypass a filter unit (12) for cleaning the laser gas flowing therethrough.

17. A gas laser assembly according to claim 14 wherein there is included in one of said bypass (8) and circulation path (5) a measuring device (14) for the volume of said laser gas flowing therethrough said measuring device (14) being connected to said adjustable flow resistor (11) in said bypass (8) by a control device (16).

18. A gas laser assembly according to claim 14 wherein there is included in said bypass a cooling device (13), and wherein there is included in said bypass a catalyst (21) for treating the gas flowing therethrough.

19. A gas laser assembly according to claim 14 wherein said gas laser assembly is a $CO_2$ laser.

20. A gas laser assembly having (a) a laser-gas circulation path (5) including a fan (4) which moves the laser gas (6) through the laser discharge space (2) and a cooling system (3a, 3b); and (b) a bypass (8) in the housing of said fan and connected to said path on opposite sides of said fan through which a part (15) of the laser gas (6) is moved by the fan (4) to bypass the laser discharge space (2), said bypass connecting the pressure side of said fan to its suction side.

21. A gas laser assembly according to claim 20 wherein there is included means for opening and for blocking said bypass (8) so that it can be turned off and on.

22. A gas laser assembly according to claim 20 wherein the pressure quotient of the fan (4) rises as the volume current (v) increases at least in increments or is constant, and wherein said fan (4) is a turbo-radial fan.

23. A gas laser assembly according to claim 20 wherein there is included in said bypass a filter unit (12) for cleaning the laser gas flowing therethrough.

24. A gas laser assembly according to claim 20 wherein there is included in one of said bypass and circulation path (5) a measuring device (14) for the volume of said laser gas flowing therethrough, and wherein said measuring device (14) is connected to an adjustable flow resistor (11) in said bypass (8) by a control device (16).

25. A gas laser assembly according to claim 20 wherein there is included in said bypass a cooling device (13), and a catalyst (21) for treating the gas flowing therethrough.

* * * * *